United States Patent
Beam et al.

(10) Patent No.: US 7,318,009 B2
(45) Date of Patent: Jan. 8, 2008

(54) EVENT CUSTOMIZATION

(75) Inventors: Jeffrey S. Beam, Edwardsville, IL (US); Craig D. McCowen, Ellisville, MO (US); Ross E. Dozier, Grover, MO (US)

(73) Assignee: American Power Conversion Corporation, West Kingston, RI (US)

( * ) Notice: Subject to any disclaimer, the term of this patent is extended or adjusted under 35 U.S.C. 154(b) by 0 days.

(21) Appl. No.: 11/038,735

(22) Filed: Jan. 18, 2005

(65) Prior Publication Data

US 2006/0161395 A1 Jul. 20, 2006

(51) Int. Cl.
*G06F 15/00* (2006.01)
(52) U.S. Cl. .................... 702/188; 702/189
(58) Field of Classification Search ........... 702/188, 702/189; 307/64, 66; 714/22, 34; 324/771
See application file for complete search history.

(56) References Cited

U.S. PATENT DOCUMENTS 5,012,406 A * 4/1991 Martin .................. 714/22
5,229,651 A * 7/1993 Baxter et al. ............ 307/66
5,606,242 A * 2/1997 Hull et al. .............. 320/106
6,741,947 B1 * 5/2004 Wichelman et al. ....... 702/122
2004/0215763 A1 * 10/2004 Ewing et al. ............ 709/223
2005/0223090 A1 * 10/2005 Ewing et al. ............ 709/223

OTHER PUBLICATIONS

RTD, 'UPS 25, Uninterruptible Power Supply User's Manual', 1999, RTD Embedded Technology, pp. 2-41.*

* cited by examiner

*Primary Examiner*—Carol S. W. Tsai
*Assistant Examiner*—Elias Desta
(74) *Attorney, Agent, or Firm*—Townsend and Townsend and Crew LLP

(57) ABSTRACT

A monitoring system for use with at least one device configured to provide information relating to the device includes at least one first input configured to receive a plurality of second, inputs from the at least one device indicative of at least one parameter relating to the at least one device, and a processor coupled to the at least one first input, the processor configured to provide a user with indicia of the second inputs for defining an event and at least one criterion for defining the event using at least one of the second inputs, the processor being configured to prompt the user to define the event using at least one of the second inputs and the least one criterion and to provide guidance to the user regarding the second inputs and the at least one criterion for defining the event.

40 Claims, 12 Drawing Sheets

EVENT CUSTOMIZATION

BACKGROUND OF THE INVENTION

Today, companies and persons rely on having consistent supply of power to electronic devices more than ever before. Without power, companies may be unable to manufacture goods, or to operate at all, such as if the company is in the business of supplying information over the Internet. Without power, businesses and individuals may be completely incapacitated regarding critical activities, such as making goods, providing services, and transacting personal finances (e.g., filing tax returns, and paying bills). Uninterruptible power supplies (UPSs) are often used to provide backup power in case of a power outage. UPSs are commonly used on computing equipment to guard against data being lost due to a power outage before the data are saved. UPSs used with computing equipment also help to guard against a loss in service by providers of information over the Internet, such as by servers, e.g., hosting web pages.

Frequently, individuals and companies monitor the supply of power to electronic devices or facilities to ensure that their affairs and/or businesses are not significantly affected by a power outage, a change in status or some other power alteration. Devices are monitored for various events and/or alarms for the purposes of diagnosing and correcting problems. It is often of critical importance that problems be diagnosed, alerted to a user, and corrective action taken as promptly as possible. Which occurrences of alterations and power, in particular, nations of such alterations, are meaningful to a particular user can be different than those of significance to another user.

Other types of information are also often monitored for various reasons. For example, environmental devices may be monitored for information such as temperature, humidity, smoke presence, water leakage, gas leakage, etc., e.g., to help determine and/or regulate environmental conditions as they may affect operation of equipment. For another example, access and security related information may be monitored, such as passcards being used, biometric identification being entered, doors being opened, etc., e.g., to help determine whether there has been improper access to a designated area and/or a potential security breach has occurred. Still other types of information may be monitored for these or other reasons.

SUMMARY OF THE INVENTION

In general, in an aspect, the invention provides a monitoring system for use with at least one device configured to provide information relating to the device, the system including at least one first input configured to receive a plurality of second, inputs from the at least one device indicative of at least one parameter relating to the at least one device, and a processor coupled to the at least one first input, the processor configured to provide a user with indicia of the second inputs for defining an event and at least one criterion for defining the event using at least one of the second inputs, the processor being configured to prompt the user to define the event using at least one of the second inputs and the least one criterion and to provide guidance to the user regarding the second inputs and the at least one criterion for defining the event.

Implementations of the invention may include one or more of the following features. The guidance includes indicia of at least one of second input types, characteristics of the second inputs to evaluate, and ways to combine event components related to the second inputs into the event. The characteristics include whether the data input is normal or abnormal. The characteristics include amounts of time for a second input to remain at a designated state before changing a condition of a corresponding event component related to a corresponding second input. The characteristics include different amounts of time for setting the corresponding event component to a first condition and for returning the corresponding event component to a second condition. The indicia of at least one of second input types includes a first menu of input types and a second menu of type instances, and wherein which instances are provided in the second menu depend upon a presently-selected input type in the first menu. The processor is configured to prompt the user to select from Boolean logic combinations of the event components to define the event. The processor is configured to prompt the user to enter a sum of product combination of event components to define the event. The event components are second inputs that meet selected criteria.

Implementations of the invention may also include one or more of the following features. The processor is configured to prompt the user to select from actions to take in response to the defined event occurring. The actions include at least one of providing an event-active text message, providing an event-inactive text message, actuating an alarm, actuating a system outlet, actuating a system relay, sending an email, sending an SNMP trap, sending a syslog notice, sending an occurrence log notice, sending a page for a pager. The processor is configured to prompt the user to configure at least one of an amount of delay from the defined event occurring before taking an action and whether to repeat a selected action. The processor is configured to prompt the user to configure, for an action selected to be repeated, at least one of an interval between repetitions of the selected action, and a limit for the repetitions, the limit being at least one of a number of repetition times and an indication to stop the repetitions if the defined event ceases to be satisfied. The processor is configured to prompt the user to configure an event trigger, and the processor is configured to evaluate, in response to occurrence of the event trigger, whether the user-configured event occurs. The processor is configured to provide a user interface for the user, the user interface providing the indicia of second inputs for defining monitored events and the at least one criterion for defining the events using at least one of the second inputs.

In general, in another aspect, the invention provides a method of defining an event associated with at least one device configured to provide information relating to the at least one device, the method including providing a user with first indicia of monitored parameters relating to the at least one device, providing the user with at least one second indication of at least one criterion for defining the event using at least one of the monitored parameters, and prompting the user to define the event using at least one of the monitored parameters and the at least one criterion, including suggesting to the user how to define the event using at least one of the monitored parameters and the at least one criterion.

Implementations of the invention may include one or more of the following features. The suggesting includes at least one of indicating types of the monitored parameters, characteristics of the monitored parameters to evaluate, and ways to combine event portions related to the monitored parameters into the event. The characteristics are amounts of time for a monitored parameter to remain at a designated state before changing a condition of a corresponding event portion related to a corresponding monitored parameter.

Indicating types of the monitored parameters includes providing a first menu of parameter types and a second menu of type instances, and wherein which instances are provided in the second menu depend upon a presently-selected input type in the first menu. Indicating ways to combine event components includes prompting the user to select from Boolean logic combinations of event portions to define the event.

Implementations of the invention may also include one or more of the following features. The method further includes prompting the user to select from actions to take in response to a defined event occurring, the actions including at least one of providing an event-active text message, providing an event-inactive text message, actuating an alarm, actuating a system outlet, and actuating a system relay. The method further includes at least one of prompting the user to select from actions to take in response to a defined event occurring, and prompting the user to configure at least one of an amount of delay from the defined event occurring before taking an action and whether to repeat a selected action. The method further includes prompting the user to select from actions to take in response to a defined event occurring including prompting the user to configure, for an action selected to be repeated, at least one of an interval between repetitions of the selected action, and a limit for the repetitions, the limit being at least one of a number of repetition times and an indication to stop the repetitions if the defined event ceases to be satisfied. The method further includes prompting the user to configure an event trigger, and evaluating, in response to occurrence of the event trigger, whether the user-configured event occurs. The first indicia and the second indication and are provided, and the user is prompted to define the event, through a graphical user interface.

In general, in another aspect, the invention provides a computer program product for use with a computer for receiving status information regarding at least one device, the computer program product residing on a computer-readable medium and including computer readable instructions for causing the computer to: present a user in communication with the computer with indications of the status information and options for defining a user-configured event related to the status information; accept input from the user regarding the options to define the user-configured event; and analyze the information in accordance with the selected options to evaluate whether the user-configured event occurs.

Implementations of the invention may include one or more of the following features. The options for defining the user-configured event include indicia of at least one of types of the at least one device, characteristics of the status information to evaluate, and ways to combine event components related to the status information into the event. The status information comprises input data regarding monitored parameters associated with the at least one device and the options comprise selectable indications of the input data. The computer program product further includes instructions for causing the computer to prompt the user to configure an amount of time that input data must have a certain value before a status of the input data will be considered changed from a previous status. The instructions for causing the computer to prompt the user to configure an amount of time include instructions for causing the computer to prompt the user to configure first and second amounts of time that input data must have first and second values before a status of the input data will be considered changed from first and second previous status, respectively.

Implementations of the invention may also include one or more of the following features. The options include options for configuring indicia of the status information regarding monitored parameters associated with the at least one device and the options comprise selectable indications of the user-configured indicia. The options comprise Boolean logic connectors. The computer program product further includes instructions for causing the computer to prompt the user to configure an event trigger, and instructions for causing the computer to evaluate, in response to occurrence of the event trigger, whether the user-configured event occurs. The computer program product further includes instructions for causing the computer to prompt the user to configure event indications to be provided by the computer and instructions for causing the computer to provide an indication of occurrence of the user-configured event. The computer program product further includes instructions for causing the computer to prompt the user to select whether to repeat the event indications and to configure, for an indication selected to be repeated, at least one of an interval between repetitions of the selected action, and a limit for the repetitions, the limit being at least one of a number of repetition times and an indication to stop the repetitions if the defined event ceases to be satisfied.

In general, in another aspect, the invention provides a monitoring system for use with at least one device configured to provide information relating to the device, the system including at least one input configured to receive information from the at least one device indicative of at least one parameter relating to the at least one device, and a processor coupled to the at least one input, the processor configured to receive instructions from a user for defining a monitored event using the received information and to evaluate the event according to the definition of the event to determine whether the event definition is satisfied, the processor being configured to receive instructions from the user for taking an action in response to the event definition being satisfied and for taking the action only if the event definition is satisfied for at least an instructed amount of time.

Implementations of the invention may include one or more of the following features. The processor is configured to prompt the user to provide at least some of the instructions. The processor is configured to prompt the user to provide instructions setting the amount of time. The processor is configured to provide web pages to prompt the user to provide the at least some of the instructions.

In general, in another aspect, the invention provides a monitoring system for use with at least one device configured to provide information relating to the device, the system including at least one input configured to receive information from the at least one device indicative of at least one parameter relating to the at least one device, and a processor coupled to the at least one input, the processor configured to receive instructions from a user for defining a monitored event using the received information and to evaluate the event according to the definition of the event to determine whether the event definition is satisfied, the processor being configured to receive instructions from the user for taking an action in response to the event definition being satisfied, where the processor is configured to condition evaluation on a triggering activity and to evaluate the event definition only in response to the triggering activity occurring if the event evaluation is conditioned on the triggering activity.

Implementations of the invention may include one or more of the following features. The processor is configured to receive instructions from the user to condition the event evaluation on the triggering activity. The triggering activity includes a change in status of least one of the at least one device. The triggering activity requires the change in status to have remained for at least a designated amount of time provided by the user.

Various aspects of the invention may provide one or more of the following capabilities. Users may easily configure combinations of occurrences into aggregate events. Alarms may be conveniently configured for specific user applications. Filters may be placed on occurrences (e.g., power, environmental, access, security, or other occurrences) to help insure false alarm rates are reduced. Event notifications and alarms may be customized to particular devices in particular companies for particular applications. Configuration options, including available signals, available inputs, types of inputs, names of inputs, alarm states for discrete values of inputs, alarm levels for analog values of inputs, time filters, evaluation methods, logical connectors, etc., may be presented to a user to facilitate event configuration. Input names, event active and inactive text, and event components comprising conditioned inputs may be customized.

These and other capabilities of the invention, along with the invention itself, will be more fully understood after a review of the following figures, detailed description, and claims.

DETAILED DESCRIPTION OF PREFERRED EMBODIMENTS

Embodiments of the invention provide techniques for customizing event alarms and notifications for monitored equipment. Sensors are connected for measuring various parameters. The sensed measurements are transmitted via communication lines to a device manager. The device manager processes the received signals indicative of the sensed measurements per user-customized events. The user is provided with a user interface, e.g., graphical user interface (GUI), for selecting states of measured parameters and combinations of the measured parameters for which notifications and/or alarms should be provided. The user preferably can select various signals and their states and combine them, for example using Boolean logic, into combined parameters forming events for which notifications and/or alarms are provided. The user may select and customize multiple events for notification upon satisfaction of the criteria defining the events. Other embodiments are within the scope of the invention.

Figure 1:
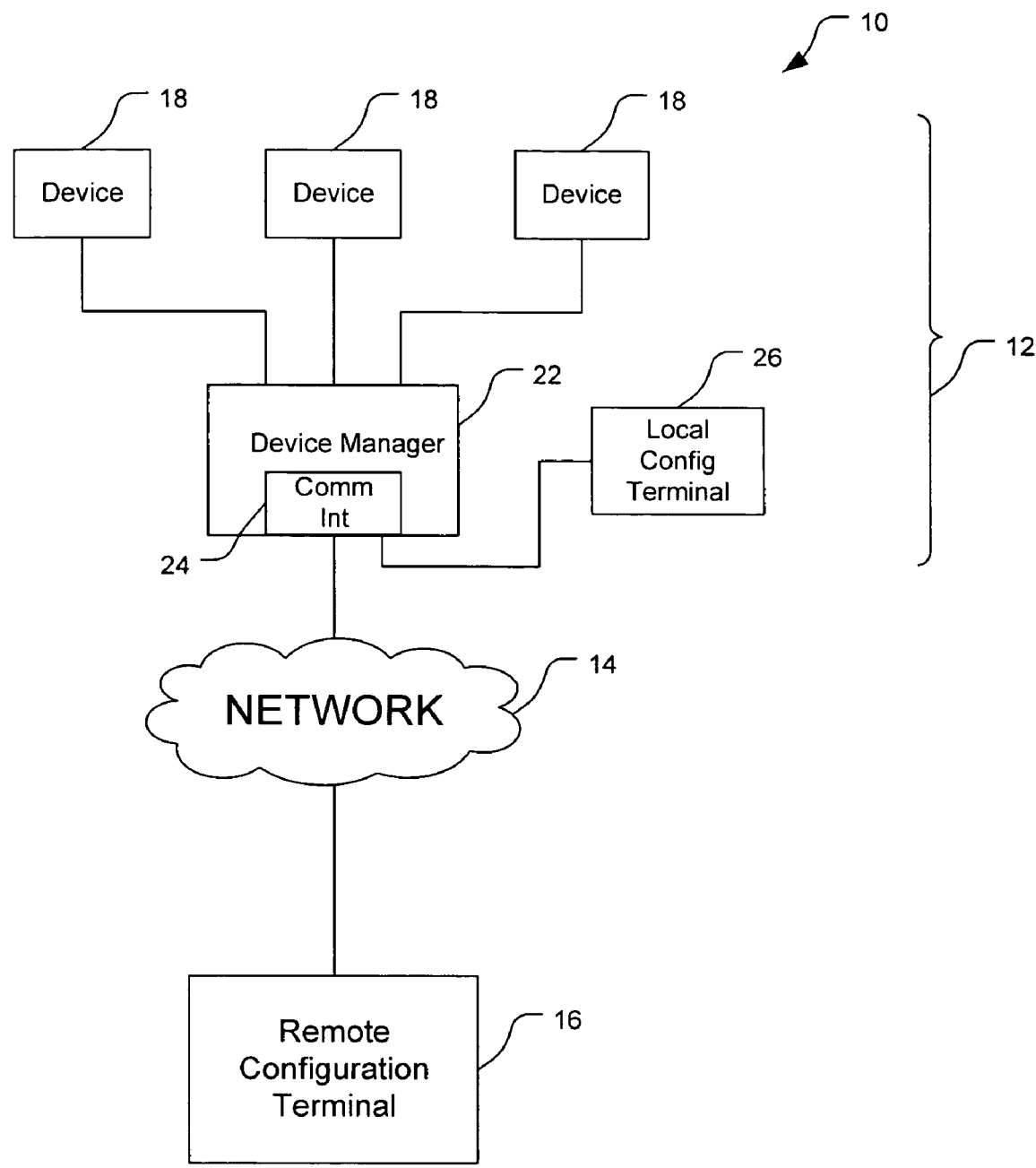
FIG. 1 is a simplified diagram of a system for monitoring and customizing event notifications and alarms for remotely-monitored equipment.

Referring to FIG. 1, a system 10 includes a customer site 12, a communications network 14, and a remote configuration terminal 16. The customer site 12 includes monitored devices 18, a device manager 22 that includes a communication interface 24, and a local configuration terminal 26. The local terminal 26 may be directly connected to the device manager 22 or through a network such as a local area network (LAN). The remote configuration terminal 16 and the device manager 22 are configured with communication interfaces and coupled for communication with the network 14. For example, the communication interface 24 is embedded in the device manager 22 to allow communication between the devices 18 and the network 14. The device manager 22 may be coupled directly to the communications network 14. The communication network 14 can be any of a variety of communication networks currently known (e.g., the Internet, a LAN, a wide area network (WAN), an integrated services digital network (ISDN), a wireless network, etc.) or developed in the future, but is preferably a LAN. The monitored devices 18 can be any of several types of devices, e.g., uninterruptible power supplies, equipment racks or rooms, battery management systems or other electronic devices or groups of electronic devices, access or security devices, environmental sensors (e.g., for temperature, humidity, vibration, smoke, fire, water, water leakage, gas, gas leakage, etc.), etc. The monitored devices 18 may be disposed remotely from each other such as in different zip codes, cities, counties, states, or even countries. Also, while the remote configuration terminal 16 may be remote from the customer site 12, the terminal 16 may be disposed at the customer site, e.g., with the network 14 being a LAN. The terminals 16, 26 may be any of a variety of devices for communicating with the device manager to receive status information from and/or provide configuration information to the device manager 22. For example the terminals 16, 26 could be computers, mobile phones, personals digital assistants, etc., and need not both be the same type of device.

The devices 18 preferably can detect and provide indications of various parameters depending upon the type of device. The devices 18 can preferably detect, as appropriate, switches to battery operation, detect increases/decreases in temperature, and/or detect an outage or a reduction or increase in power exceeding a threshold. The devices 18 can produce and send indications of the parameters (e.g., power failing to meet requirements) to the device manager 22.

These indications can provide the device manager 22 with a variety of information regarding the parameters. Further, the information can include a time associated with the parameter. The devices 18 can also determine and report status of the devices 18 and/or actions taken with respect to a device 18. The device manager 22 is configured to collect data from the devices 18 regarding detected parameters such as power status, temperature, humidity, load, vibration, smoke, fire, etc. relating to the devices 18 and to process these data as discussed below. The device manager 22 can receive such data on one or more physical inputs. More than one type of data may be collected over the same physical input (e.g., in a time-division-multiplexed manner).

The communication interface 24 is embedded in the device manager 22 and is configured as a software program and hardware to provide an interface between the devices 18 and the network 14 and the local terminal 26. The communication interface 24 processes the information collected from the device 18 and can provide the information to the local terminal 26 or via the communication network 14 to the remote terminal 16. Other configurations of the communication interface 24 are possible such as pure hardware configurations, etc.

Figure 2:
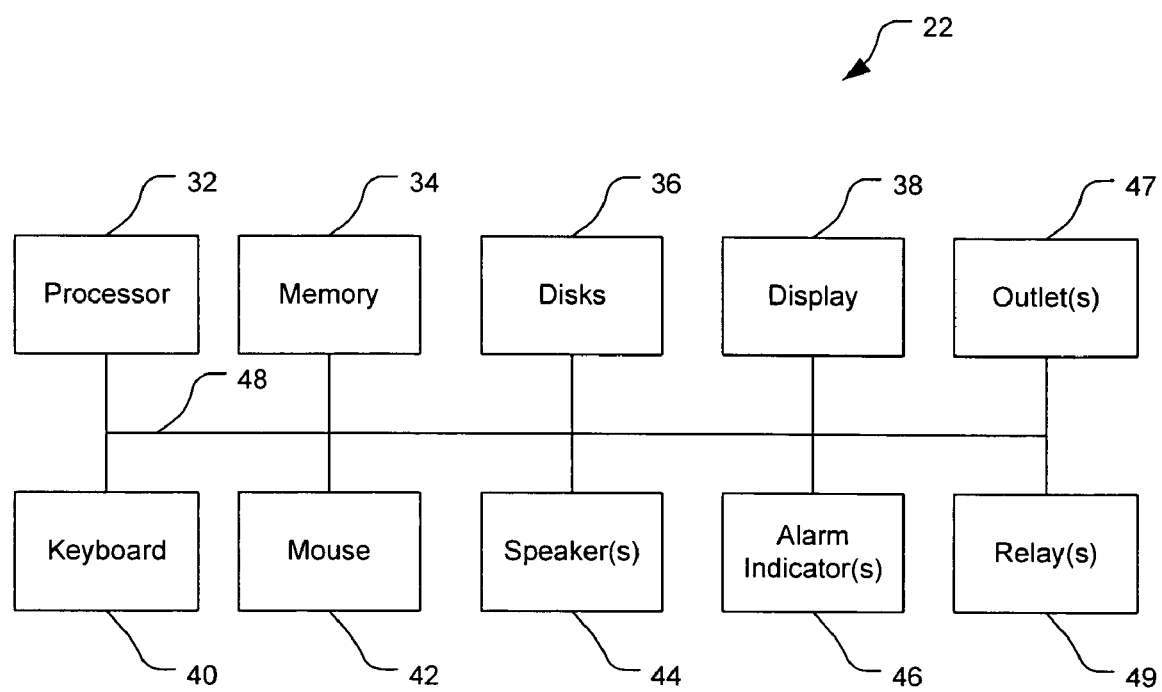
FIG. 2 is a simplified block diagram of a device manager shown in FIG. 1.

Referring to FIG. 2, the device manager 22 comprises a computer system including a processor 32, memory 34, disk drives 36, a display 38, a keyboard 40, a mouse 42, one or more speakers 44, one or more alarm indicators 46, one or more outlets 47, and one or more relays 49 (with the communication interface 24 not shown). The processor 32 is preferably an intelligent device, e.g., a personal computer central processing unit (CPU) such as those made by Intel® Corporation or AMD®, a microcontroller, an application specific integrated circuit (ASIC), etc. Memory 34 includes random access memory (RAM) and read-only memory (ROM). The disk drives 36 include a hard-disk drive and can include floppy-disk drives, a CD-ROM drive, and/or a zip drive. The display 38 is a cathode-ray tube (CRT), although other forms of displays are acceptable, e.g., liquid-crystal displays (LCD) including TFT displays. The keyboard 40 and mouse 42 provide data input mechanisms for a user (not shown). Other embodiments of the device manager 22, e.g., not including the display 38, the keyboard 40, the mouse 42, the disks 36, the outlet(s) 47, the relay(s) 49, the speakers 44, and/or the alarm indicator(s) 46 may be used. The speaker(s) 44 can produce audio output for the user of the device manager 22. The alarm indicator(s) 46 can alert the user of undesirable conditions, e.g., the occurrence of a configured event. The indicator(s) 46 may be visual, such as lights (e.g., LEDs, a beacon, etc.), flashing symbols on the display 38, highlighted text (e.g., red and/or bold and/or flashing) on the display 38, etc. The outlet(s) 47 is(are), e.g., an 115 VAC outlet(s) into which an electronic device(s) may be plugged. The relay(s) 49 are switches for connecting devices that the user connects to the relay(s) 49. The components 32, 34, 36, 38, 40, 42, 44, 46, 47, and 49 are connected by a line 48 (portions of which may be a bus). Some or all of the outlet(s) 47, relay(s) 49, and/or the alarm indicator(s) 46 could be located at the devices 18. The device manager 22 can store, e.g., in the memory 34, software code containing instructions for controlling the processor 32 to perform functions described below.

Functions performed by the device manager 22 provide a user interface, e.g., a graphical user interface (GUI), for the customer to use to customize events, event notifications, and alarms. The interface may be provided in the form of web pages that may be accessed and displayed on the display 38 and/or accessed by and displayed at the terminals 16, 26 for users of the terminals 16, 26. For the discussion below, it is assumed that a user at one of the terminals 16, 26 performs the configuration described. The terminals 16, 26 include web browsers for accessing and manipulating the user interface. The terminals 16, 26 could be, e.g., mobile phones, computers, laptops, PDAs, pagers, etc. including other devices capable of receiving emails, SNMP traps, or otherwise interacting with the device manager. Other forms, e.g., aside from web pages, of the user interface are possible and within the scope of the invention.

The user interface provided by the device manager 22 provides a logical, preferably interconnected, set of menus and configuration screens for configuring customized events. The user can make selections in order to be presented with desired screens, with which subsequent screens being presented being dependent on selections made at previous screens. The user is presented with a series of screens based on the user's selections for configuring attributes of signals corresponding to measured device parameters received, as well as configuring combinations of the configured signals to form events. The user may also configure notifications and/or alarms to be provided upon the occurrence of the events, as well as when the notifications should terminate, corresponding to termination of the events. The notifications and/or alarms may be further configured, e.g., to persistently (e.g., periodically) be provided and limits placed on them (e.g., number of times that a notification will be sent or an alarm actuated). Further, the user can configure desired actions (e.g., one or more of the outlets 47 being activated, one or more alarms, e.g., beacons, being activated, one or more of the relays 49 being toggled, emails being sent, SNMP traps being sent, syslog notices being sent, event log notices being sent, pages being sent, etc.) to be implemented upon the occurrence and/or termination of events.

Figure 3:
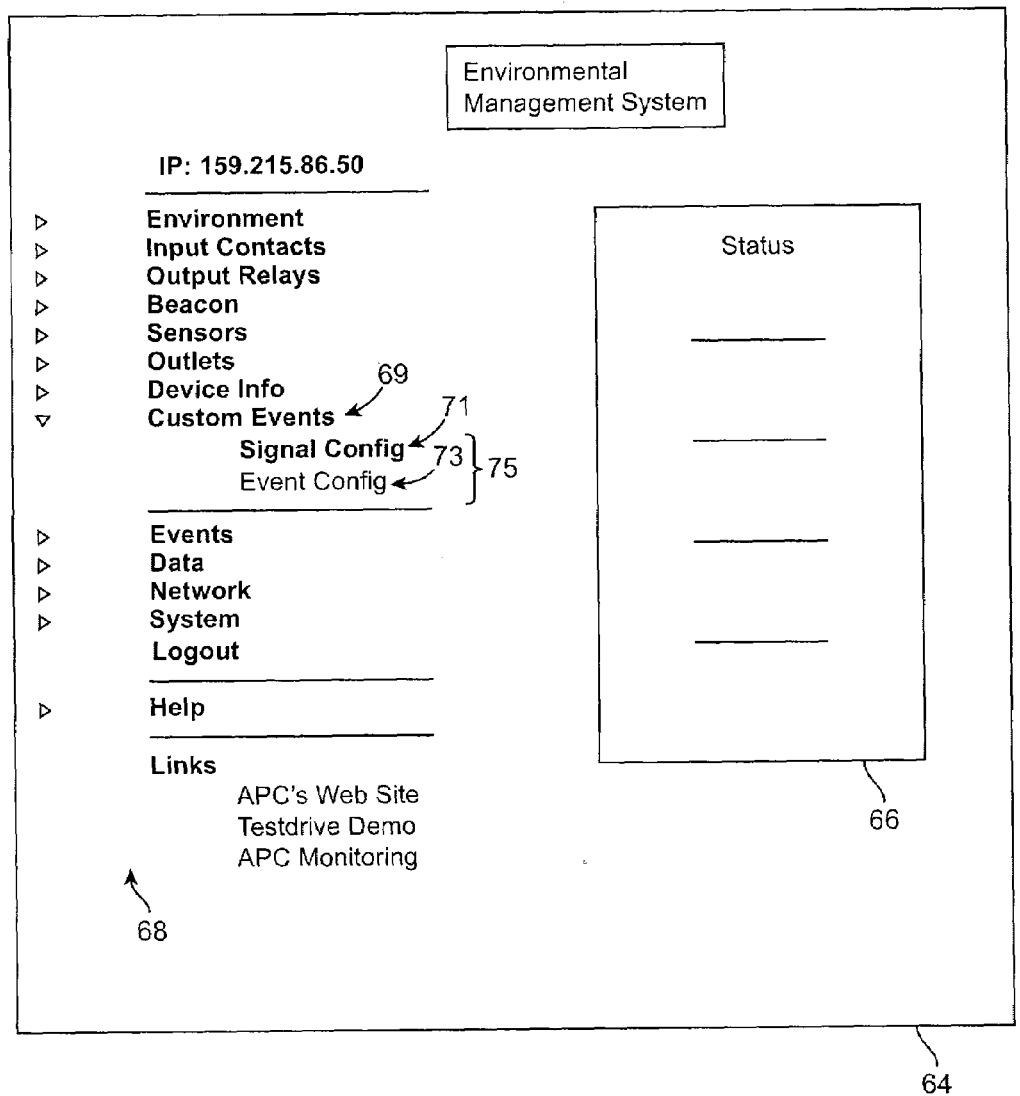
FIG. 3 is a simplified screen shot of a main user interface screen presented by a configuration terminal shown in FIG. 1.

Screens presented to the user for configuring signals and events may take a variety of forms. For example, referring to FIG. 3, a main user interface screen 64 may be presented to the user. The main screen 64 provides a status section 66 with status of relevant items (e.g., devices, inputs, outputs, relay settings, etc.). The screen 64 also includes a main menu 68, which can be presented as part of any/every screen presented to the user. Using the main menu 68, the user can access other screens by selecting desired screen links. For example, the user can select a custom events screen link 69 that will cause a submenu 75 to appear, the submenu 75 including a signal configuration screen link 71 and an event configuration screen link 73. The event configuration link 73 may be selected to present the user with an event status and configuration screen 130, discussed below with respect to FIG. 6. The signal configuration link 71 may be manually selected by the user, or may be automatically selected by selection of the custom events link 69, to (automatically) present a signal configuration overview screen 70 to the user.

Figure 4:
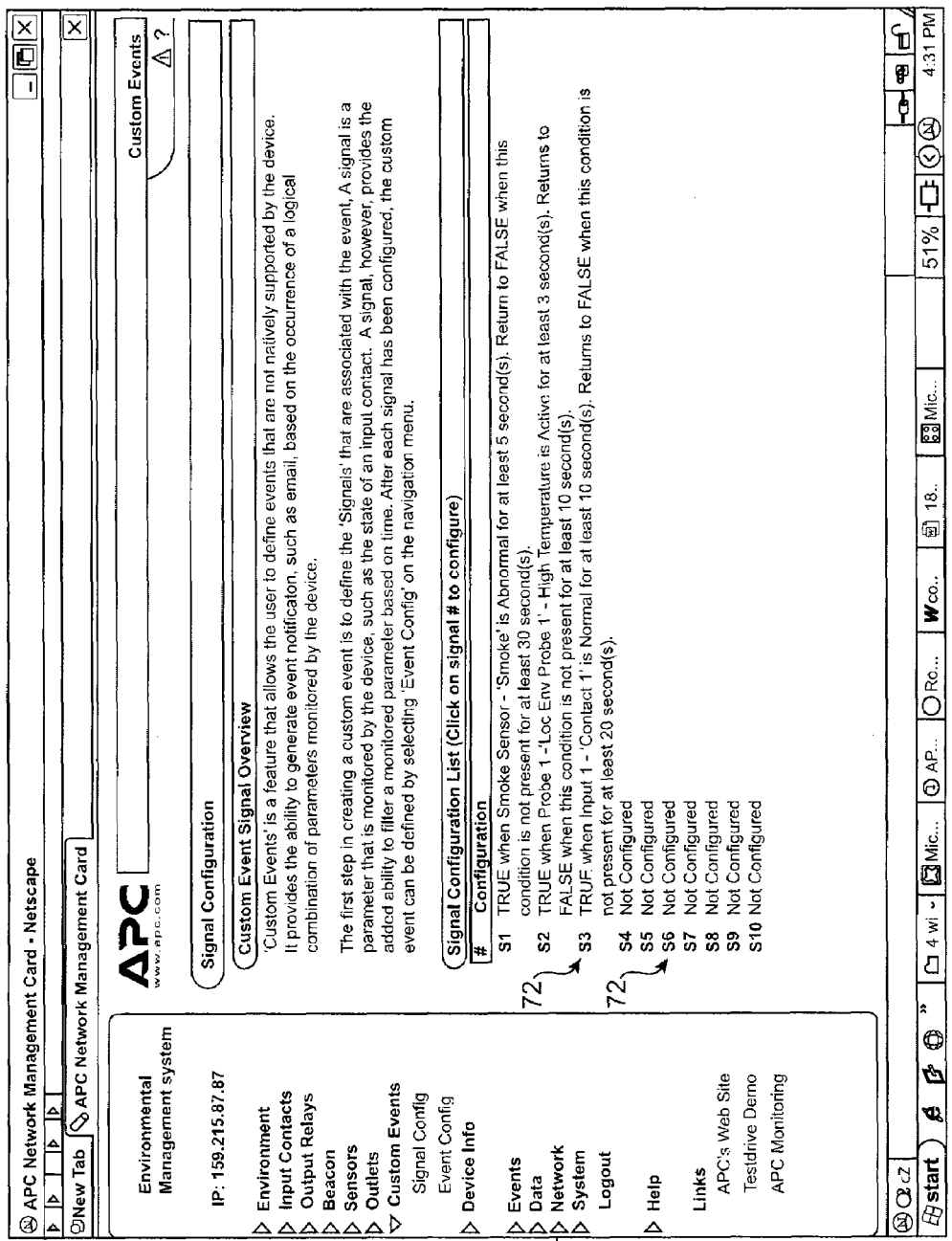
FIG. 4 is a simplified screen shot of a signal configuration overview screen presented by a configuration terminal shown in FIG. 1.

Referring to FIG. 4, the signal configuration overview screen 70 includes a description of event customization and several signal designators 72. Various signals can be configured to correspond to signals designators 72, e.g., signals S1, S2, S3 . . . As shown in FIG. 4, the signal designators 72 correspond to various signals as designated by the user. Here, the signals S1, S2, S3 have been configured while other signals have not been assigned to inputs and defined by the user. To configure a signal, the user selects a signal designator 72 for an undefined signal, here any of the designators 72 for signals S4-S10. In response to such a selection, the user is presented with a signal configuration screen 50 shown in FIG. 5 discussed below. If the user desires to reconfigure a previously configured signal, then the user can select one of the signal designators 72 for which a configurations has been established, here, for the signals S1-S3. The menu 68 is preferably presented on the screen 70, and other screens.

Figure 5:
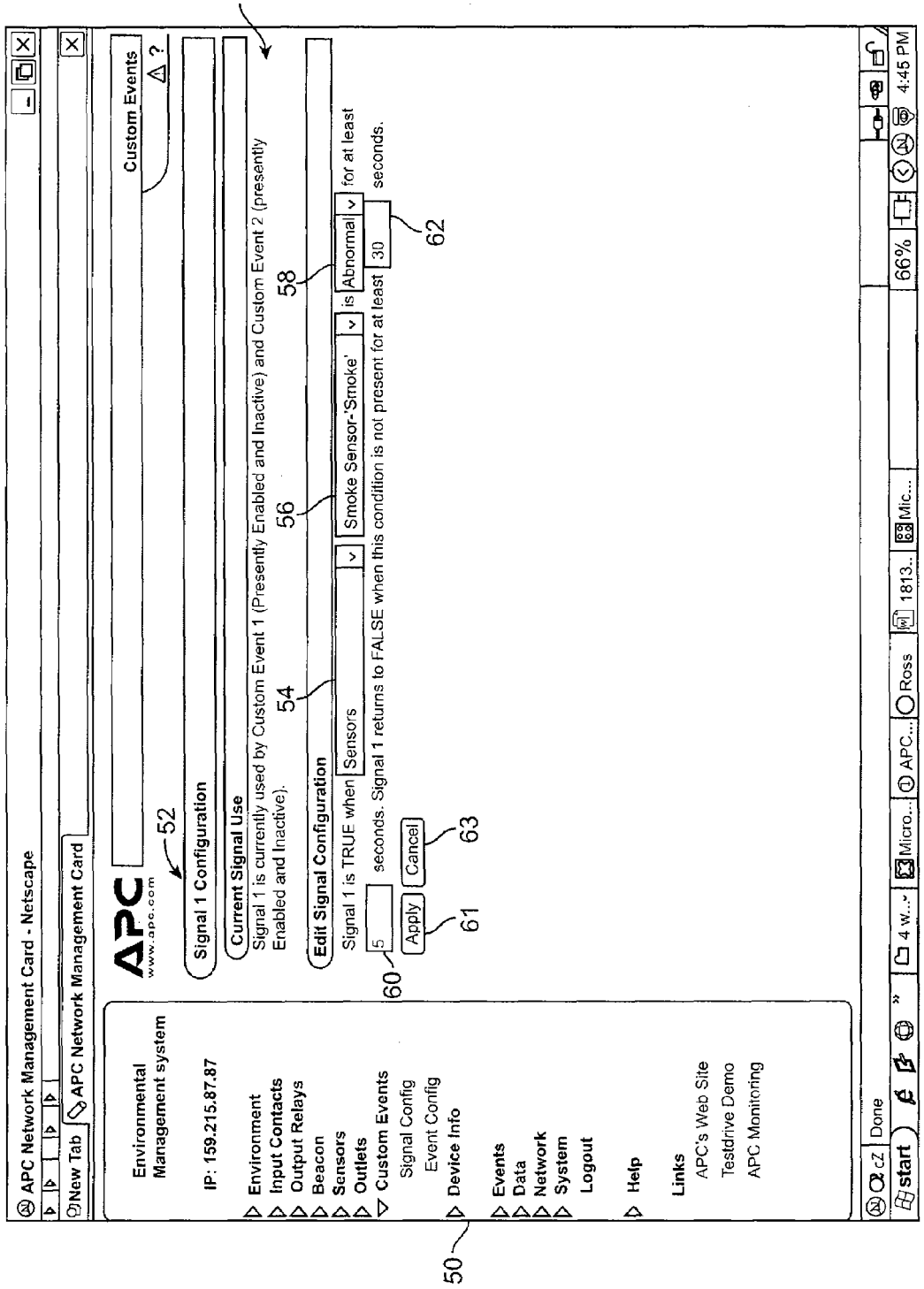
FIG. 5 is a simplified screen shot of a signal configuration screen presented by a configuration terminal shown in FIG. 1.

Referring to FIG. 5, the signal configuration screen 50 provides a signal use section 51, an indication 52 of which signal is being configured, and attribute selection windows 54, 56, and 58. The section 51 indicates what custom event(s) the selected signal is presently used in as part of the event's (or events') definition(s). The section 51 also indicates whether the active/inactive and enabled/disabled status of the corresponding event(s). The section 51 helps the user decide whether and how to modify a signal based on whether it is part of one or more custom events. The screen 50, including the section 51 and the attribute selection windows 54, 56, 58, 60, 62 are exemplary only and not limiting of the invention. Other configurations, including different numbers of attribute selection windows and attributes for which the windows relate, may be used. Here, the attribute selection windows 54, 56, 58 are drop-down windows allowing the user to select from multiple choices provided and preprogrammed for the corresponding windows. The choices guide the user's selections and facilitate configuration of the signal. The choices provide the available options for configuring the corresponding aspect of the selected signal. The windows 54 and 56 are used to define the source for the signal. The window 54 prompts the user to select an input type, e.g., sensors for fire or door open/closed status etc., environmental probes, etc. and the window 56 prompts the user to select a particular instance of the type chosen in the window 54. For example, a "sensor" may be chosen using the window 54 and "smoke" may be chosen using the window 56. The options provided to the user in the window 56 for prompting an instance selection depend upon the selection made in the window 54 and change as appropriate when different types are chosen using the window 54. The source selection of the windows 54, 56 could be provided in a single window or more than two windows, although two windows is preferred for ease of use/presentation. The window 58 allows the user to designate a condition for the input selected in the window 54 that will make the selected signal be true (the signal is true in this example as the true state is preprogrammed for this screen 50, although in other embodiments the false state could be used). Here, the drop-down menu for the window 58 allows the user to select abnormal or normal for the state of the selected input for use in the formula for making the selected signal true.

The signal configuration screen 50 also provides attribute selection windows 60, and 62. The selection window 60 allows the user to designate an amount of time, here a number of seconds, for the input to retain its state as designated in the selection window 58 before the selected signal will be considered to be true. The selection window 62 allows the user to designate an amount of time, here a number of seconds, for the condition selected in the window 58 to no longer be present before the selected signal will be returned to a false state. The numbers of seconds may be completely arbitrarily selected by the user, or may be limited (e.g., through a drop-down menu) to predetermined intervals of time such as 15 seconds, 30 seconds, 45 seconds, etc. The lengths of time designated for turning a signal to a true condition or returning the signal to a false condition may depend on that particular signal (e.g., power failure signals may be designated to have a shorter amount of time before becoming true than other less critical signals, such as low humidity). The time delay in turning a signal to the true condition as designated by the attribute collection window 60 helps prevent false alarms from being sent to the user, e.g., when an input parameter is fluctuating about the condition upon which it is considered to be abnormal. The time delay designated in the window 62 helps ensure that the selected input has indeed reached a value (e.g., returned to a normal state) warranting a change in the true/untrue state of the signal. The screen 50 includes apply and cancel buttons 61, 63 to accept and use the entered information or to reset the fields in the screen 50 to previously-stored values, respectively.

Figure 6:
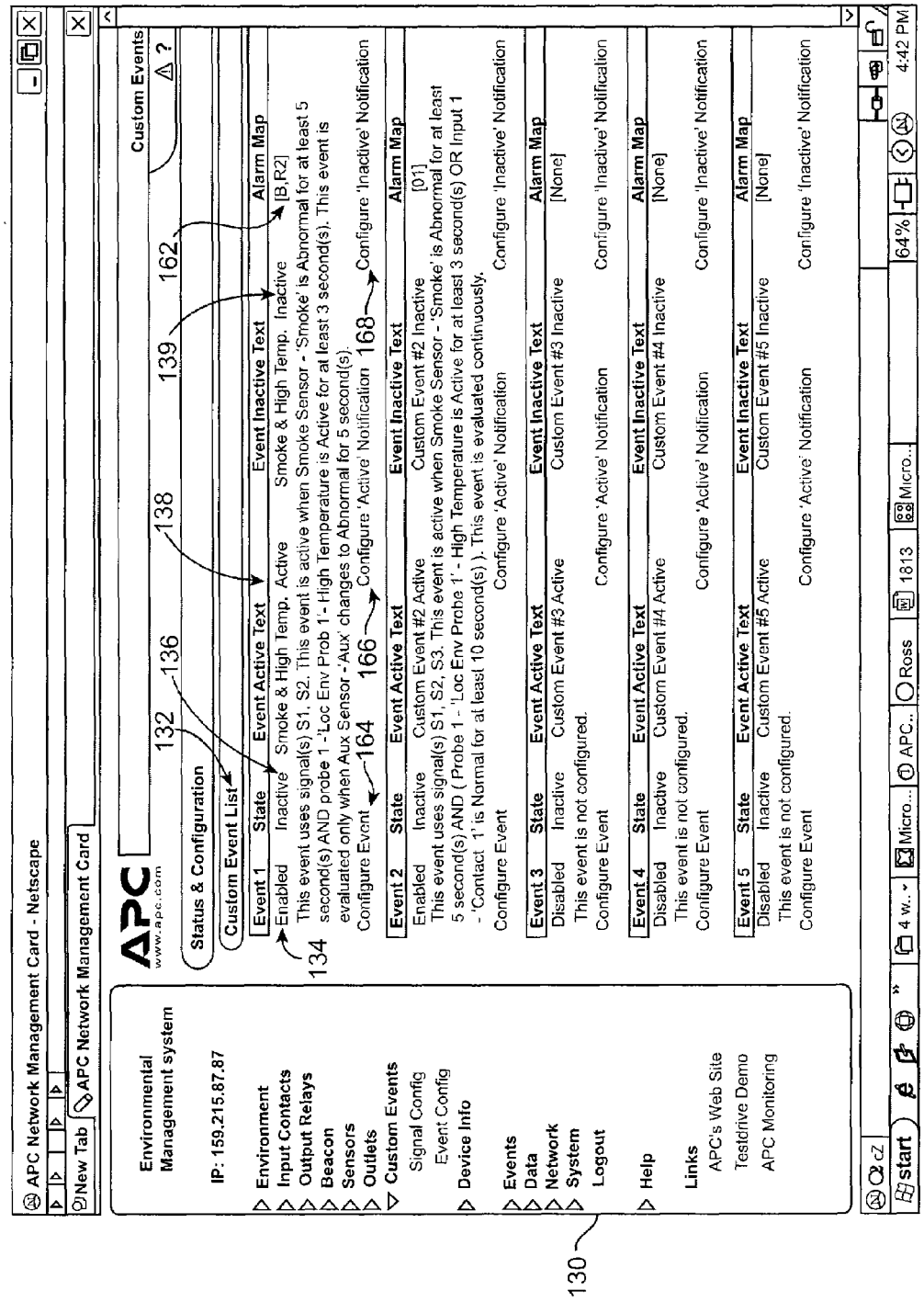
FIG. 6 is a simplified screen shot of an event status and configuration overview screen presented by a configuration terminal shown in FIG. 1.

Referring to FIG. 6, the event status and configuration overview screen 130 includes a list 132 of events. For each event in the list 132, there is an enabled/disabled identifier 134, a state indicator 136, event active text 138, event inactive text 139, and an alarm map indicator 162. The enabled/disabled indicator 134 indicates whether the event will be evaluated. The state indicator 136 indicates whether the event is active or inactive and the active text 138 and inactive text 139 provide text messages to be provided to the user if the event is active or inactive, respectively. The alarm map indicator 162 indicates what actions will be taken if the event is active. Notification parameters (e.g., recipients, persistence data, etc.) can be customized using a screen 140, shown in FIG. 9 and discussed below, that is provided in response to selection of a configure active notification link 166. A similar screen can be provided in response to selection of a configure inactive notification link 168. The enabled/disabled nature of the event, the text messages 138, 139, and the alarm mapping may be altered by selecting a configure text link 164 and using an event configuration screen 80, shown in FIG. 7 and discussed below, that is provided in response to selection of the link 164.

Figure 7:
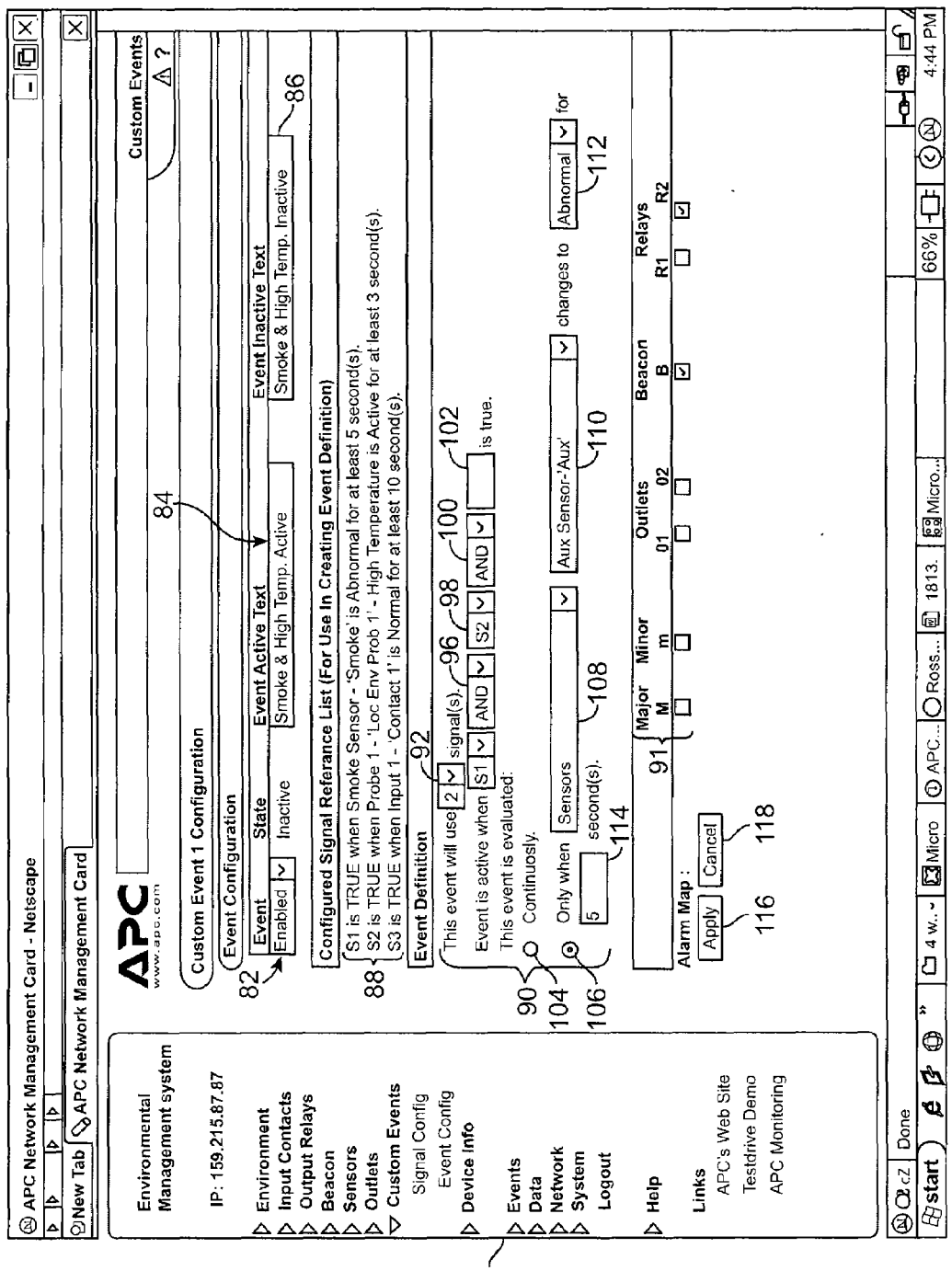
FIG. 7 is a simplified screen shot of an event configuration screen presented by a configuration terminal shown in FIG. 1.

Referring to FIG. 7, the event configuration screen 80 provides information regarding configured signals and configuration windows for configuring when events occur. Here, the event configuration screen 80 provides an enabled/disabled window 82, an event active text window 84, an event inactive text window 86, a signal configuration information section 88, an event definition section 90, and an alarm mapping section 91. The event configuration screen 80 is designed to allow a user to easily navigate the screen 80 to select and configure an event such that, e.g., the user can be provided with customized text depending on whether the event is inactive or active. The screen 80 is designed to facilitate event configuration by providing information about what signals are available for forming an event, and providing prompts for available options for defining an event, as well as providing easily configurable alarm mapping.

The enabled/disabled window 82, and the text windows 84, 86 help the user to define whether an event is available for evaluation and the text depending on the state of the event. The event enabled/disabled window 82 allows the user to either enable or disable the selected event. Only enabled events are evaluated according to the criteria designated in the event definition section 90. The user can enter desired text in the windows 84, 86 to be displayed for the user's viewing depending on whether the event is active or inactive.

The signal information section 88 provides information as to what signals are available for defining the event. The signal information section 88 preferably lists only those signals that have been defined and provides synopses of their respective definitions.

The event definition section 90 includes event configuration selection windows 92, 94, 96, 98, 100, and 102. The user selects the number of signals to be used in the definition using the signal quantity selection window 92. The available options for quantities of signals to be selected is preferably limited to the number of signals for which definitions have been produced and are currently available for use in definitions of events. With this selection made, the windows 94, 96, 98, 100, 102, or others as the case may be depending on the number of available signals, are either enabled or disabled according to the selected number to be used in the event definition. Thus, for example, in FIG. 7, with two signals having been selected in the window 92, only windows 94, 96, and 98 are active and thus in normal line thickness while the windows 100, 102 are shadowed indicating their inactive status and unavailability for selection. The user can use the event-active selection windows 94, 96, and 98 to select the signals to be used in the event definition and to combine those in a desired fashion using Boolean logic. The user thus indirectly selects to combine data inputs (by way of the signals that are related to the data inputs) into events. Other manners for entering the logic combining the signals (or data inputs directly) to form an event may be used. For example, logical combinations can be reduced to a sum-of-products representation and thus the user may be prompted to enter a sum of products directly.

The event definition section 90 also includes event configuration selection windows 104, 106, 108, 110, 112, and 114. The user can select either of the buttons 104 or 106 to select whether the event will be evaluated continuously or in response to a designated prerequisite criterion (or criteria), respectively. If a trigger-induced evaluation is selected by choosing the button 106, then the selection windows 108, 110, 112, and 114 are changed from inactive/shadowed to active/normal appearance. With these windows in normal appearance and thus active and available for selection, the user may choose the category or categories of the signals at windows 108, 110, the status at window 112 to which the category of signal needs to change, and the duration at window 114 for which the new state must exist for the definition to be satisfied. The alarm map section 91 includes selection windows for designating whether the event is a major or minor event as well as action windows for designating which if any outlets 47 to activate, whether a beacon should be activated, or which if any relays 49 are to be activated (closed) upon the occurrence of the event (i.e., upon the event definition being satisfied). The alarm mapping is exemplary only as other types of controllable outputs may be configured for selective actuation. There are also application windows 116 and 118 for selecting whether to apply or cancel (reset to previously-stored values) the selections made in the screen 80.

Figure 8:
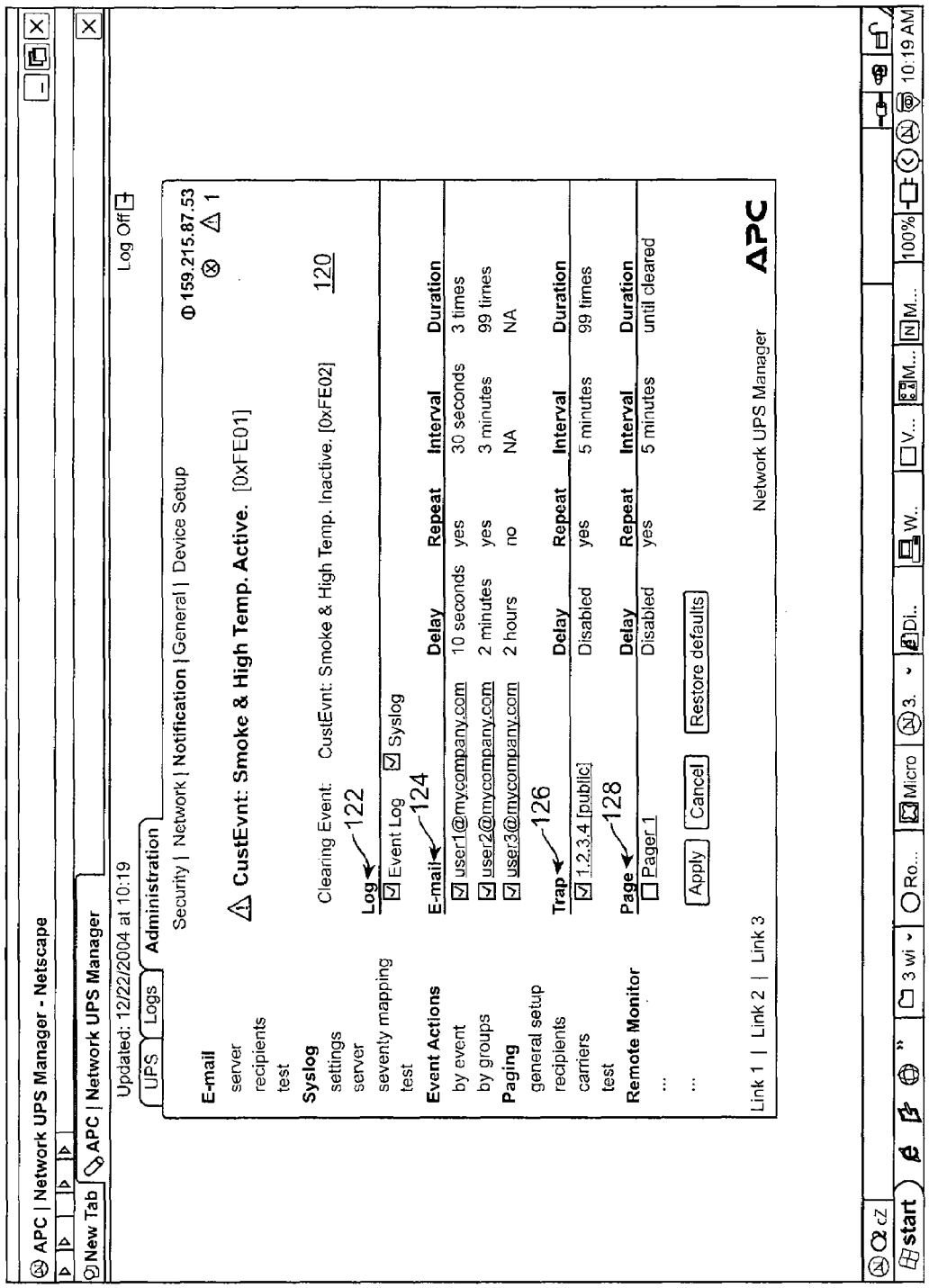
FIG. 8 is a simplified screen shot of an event notification customization screen presented by a configuration terminal shown in FIG. 1.

Referring to FIG. 8, an event notification customization screen 120 includes log, e-mail, trap, and page sections 122, 124, 126, 128. The screen 120 assists the user with configuring what notifications are provided regarding events and to whom. Using the log section 122, the user can select whether to enable reporting event log or syslog information. In the e-mail section 124 the user can select which e-mail recipients to receive notifications regarding the event. The e-mail section 124 indicates parameters regarding the e-mail notifications, whether to repeat the notification, and if so the interval between repeated notifications and a limit to the number of repeated notifications. Here, a notification delay may be configured that is the time from event activation (i.e., when the configured event conditions are satisfied) to initial reporting/notification during which the event should remain active for the notification to be sent. The event should remain active until the time of a selected repeat notification for the repeated notification to be sent. The notification delay may be different for different users to act as an alarm escalation so that one or more users are notified before one or more other users so that any issue may be resolved before the latter user(s) is(are) notified. For example, the latter user(s) may be more senior than the former user(s). In the trap section 126, the user can enable or disable event reporting through SNMP traps. The trap section 126, indicates an initial reporting delay, whether to repeat the notices, a repetitive notice interval, and a maximum number of repetitive notices to send. In the page section 128, the user can enable notices to be sent to pager recipients. The section 128 indicates an initial reporting delay, whether to repeat the notices, a repetitive notice interval, and a maximum number of repetitive notices to send. The e-mail, trap, and page recipients can be entered by the user on other screens by selecting appropriate recipient links for the user to be presented with corresponding recipient-configuration screens. The e-mail and page links are provided on the screen 120, while the trap link is provided on a different screen. Appropriate screen icons allow the user to apply edits to selections on the screen 120, cancel such edits, or restore previously-set values (e.g., for the delay value, whether to repeat notices, repeat intervals, and/or limits on number of repeat notices). The user can select a recipient indicator to be provided with a notification parameter customization screen 140 shown in FIG. 9.

Figure 9:
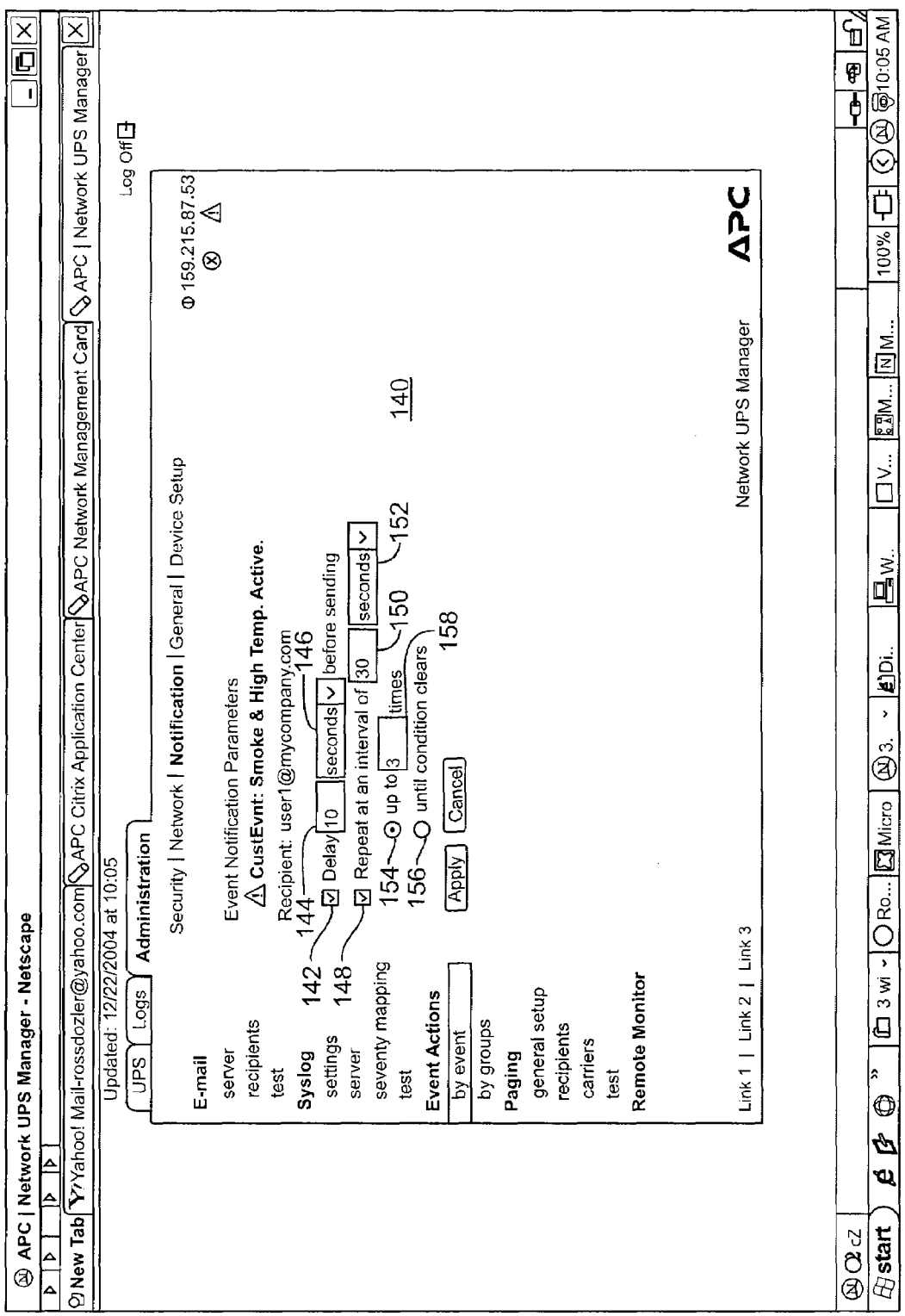
FIG. 9 is a simplified screen shot of a notification parameter customization screen presented by a configuration terminal shown in FIG. 1

Referring to FIG. 9, the notification parameter customization screen 140 assists the user with configuring the notification parameters for a selected notification. The screen 140 prompts the user with a window 142 to enable an initial notification delay, for each notice recipient. The screen 140 further prompts the user with windows 144, 146 to configure (both amount and units, e.g., second, minutes) the notification delay, this delay being the amount of time that the event should be active from initial event occurrence (i.e., event definition being satisfied, including any trigger) before the first reporting of the event to the corresponding recipient. Windows 148, 150, 152 prompt the user to enable or disable repeated notifications, and to select persistence parameters for the notifications, here the quantity and units for an interval between repeated notices. Selection buttons 154, 156 prompt the user to select to limit a quantity of repeated notices or to continue to repeat the notices until the event condition changes (here, ends). If the button 154 is selected to choose to limit the number of notices, then the user enters the limit of the number of notices to provide using a window 158. The screen 140 includes apply and cancel buttons 159, 160 to accept and use the entered information or to reset the fields in the screen 140 to previously-stored values, respectively.

Figure 10:
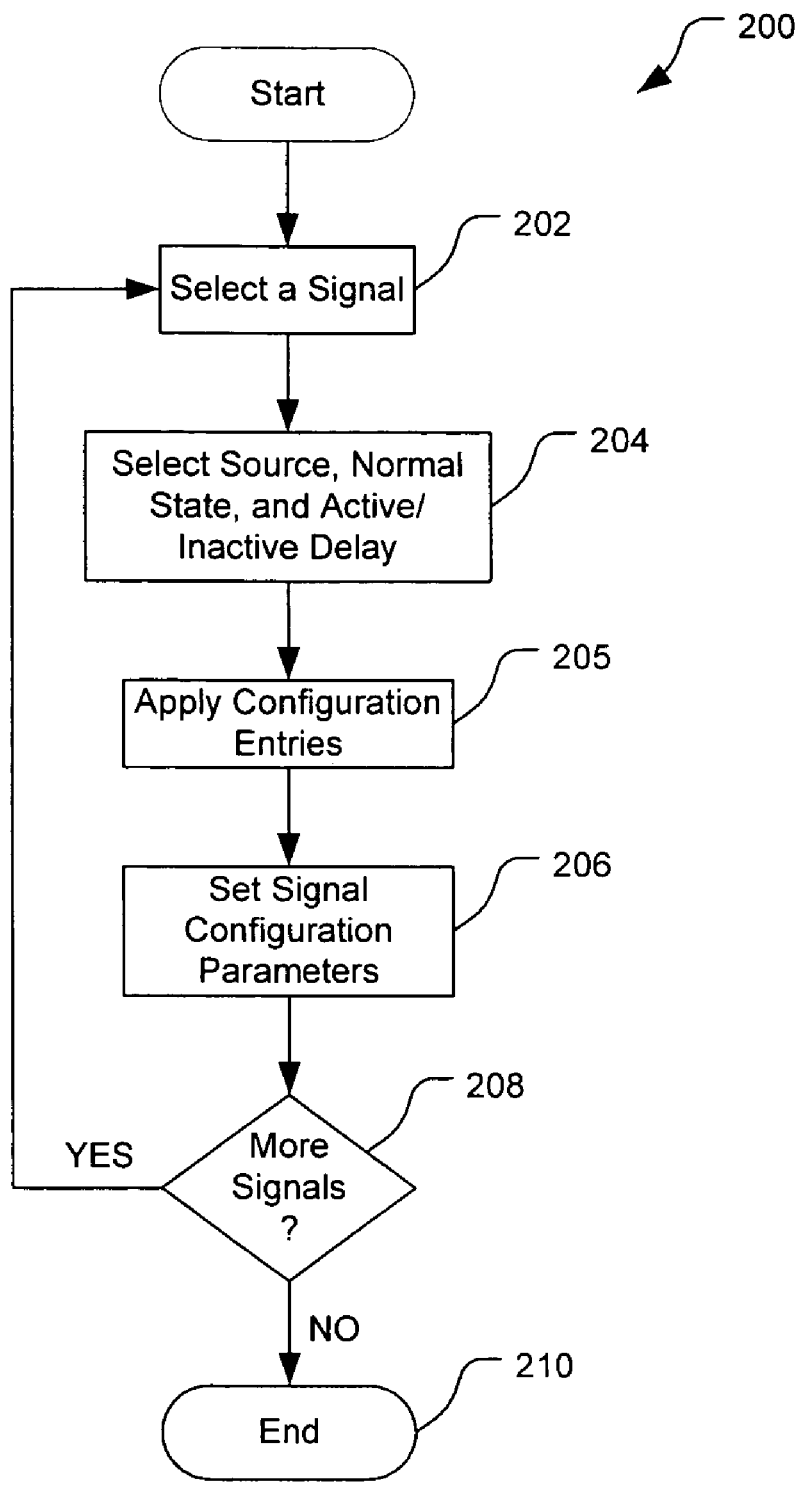
FIG. 10 is a block flow diagram of a process of configuring a signal using a configuration terminal shown in FIG. 1.

In operation, referring to FIG. 10, with further reference to FIGS. 1-5, a process 200 for designating signals for events using the configuration terminal 16 includes the stages shown. For exemplary purposes, the discussion below (and the discussions regarding FIGS. 11 and 12) assumes that the terminal 16 is used, although the discussion applies equally to the terminal 26. The process 200 is exemplary only and not limiting. The process 200 may be altered, e.g., by having stages added, removed, or rearranged.

At stage 202, the user selects a signal for configuration. The configuration terminal 16 presents the main interface screen 64 and the user selects (e.g., using the keyboard 40 and/or the mouse 42) the custom events link 69 and the signal configuration link 71 is either automatically selected or manually selected by the user. The configuration terminal 16 presents the signal configuration overview screen 70 to the user on the display 38 and the user selects the desired signal designator 72, causing the configuration terminal 16 to present the user with the signal configuration screen 50 for the selected signal.

At stage 204, the user configures the selected signal. The user selects the desired signal source, selects the normal state for the signal, and selects/enters the active and inactive delay times using the selection windows 54 and 56, 58, 60, and 62, respectively. The user can also reset the fields to previously-stored values using the cancel button 63.

At stage 206, the user sets the signal configuration parameters. With the signal parameters configured as desired, the user accepts and sets the edits/entries by actuating the apply button 61.

At stage 208, a decision is made as to whether to configure more signals. The user may not be presented with an actual inquiry, it being implied that the user may select to configure other signals from the signal configuration overview screen. If the user desires to select more signals, then the process 200 returns to step 202 where the user selects a signal (be it the same signal or a different signal). If the user does not desire to configure more signals, then the process 200 ends at stage 210.

Figure 11:
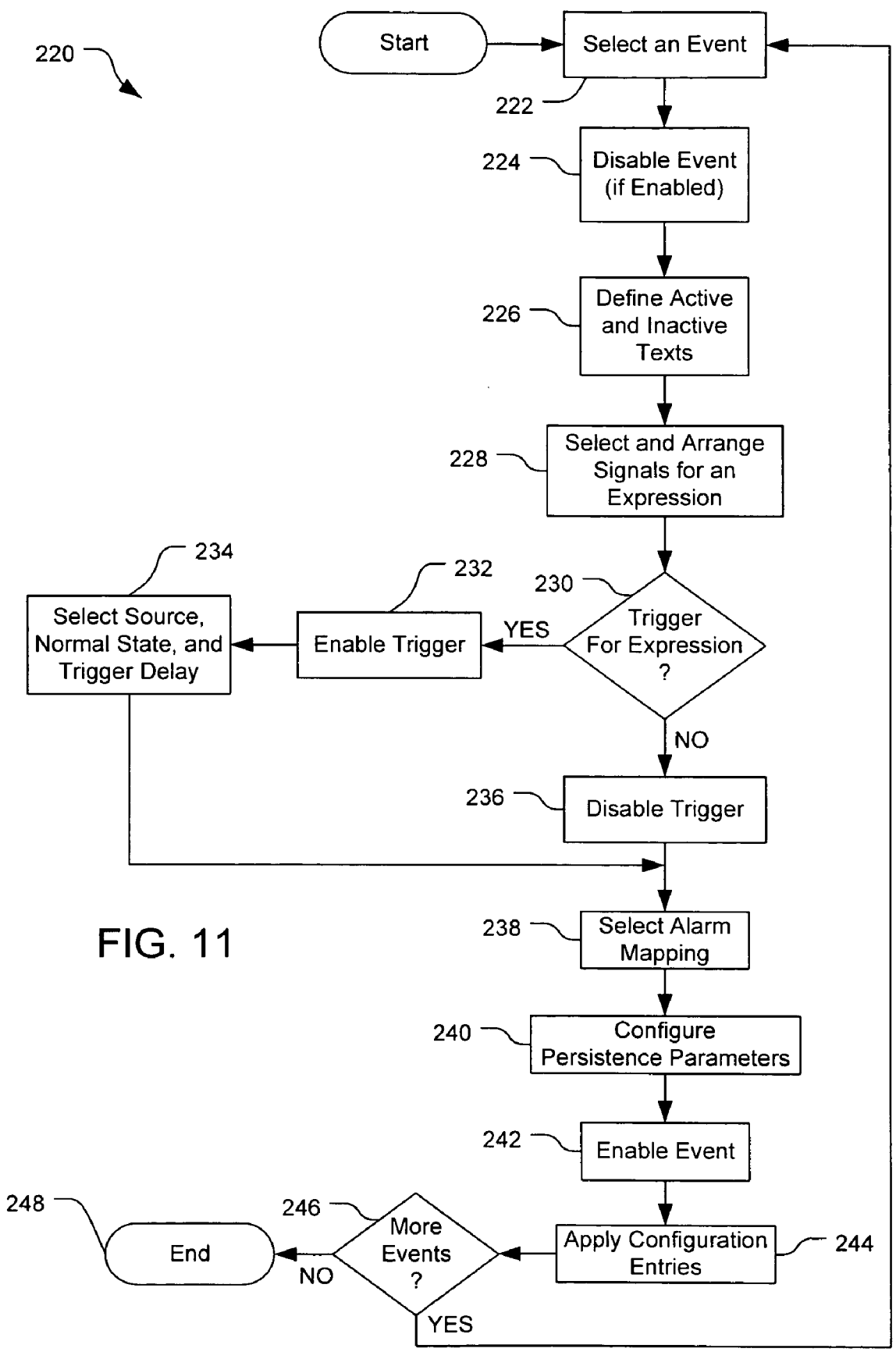
FIG. 11 is a block flow diagram of a process of configuring an event using a configuration terminal shown in FIG. 1.

In operation, referring to FIG. 11, with further reference to FIGS. 1-3 and 6-8, a process 220 for customizing events using the configuration terminal 16 includes the stages shown. The process 220, however, is exemplary only and not limiting. The process 220 may be altered, e.g., by having stages added, removed, or rearranged.

At stage 222, the user selects an event to configure from the event status and configuration overview screen 130. The screen 130 is presented to the user in response to the user selecting the event configuration link 73 from the screen 64. The user selects an event to configure by selecting the corresponding configure event link 144 from the screen 130, causing the configuration terminal 16 to present the event configuration screen 80.

At stage 224, the selected event is disabled if it is currently enabled. The user may disable the event by selecting "disabled" from the drop-down menu in the enabled/disabled selection window 82. The event is disabled during configuration to help prevent event evaluation errors resulting from evaluating a changing event definition. This stage may be omitted because new event configuration parameters preferably do not take effect until the apply button 116 is actuated at stage 244 below.

At stage 226, the user defines the text messages for active and inactive states. The user inputs text messages in the windows 84, 86 for display when the event is active or inactive, respectively.

At stage 238, the user selects signals and arranges the selected signals to form an expression defining the event. The user views the available, configured signals in the signal information section 88 of the screen 80, and uses the window 92 to select the number of signals to be used to define the event. The user configures the logical combination of the selected signals using the available windows, e.g., the windows 94, 96, 98, 100, 102 (although more windows would be available if more than three signals were configured). Alternatively, the user could enter a logical expression as a sum or products representing the desired logical combination of the desired signals. For example, the expression may take the form: Event=(S? AND S? . . . S?) OR (S? AND S? . . . S?) OR . . . (S? AND S? AND S? . . . S?), where S? indicates a desired signal, e.g., S1, etc. The example is for illustrative purposes only and is not limiting. For example, other numbers of ANDed signal combinations in any of the parenthetical components could be used, as well as other quantities of ORed parenthetical components.

At stage 230, a decision is made as to whether the event being configured will use a trigger. If the user does not want the event expression evaluation conditioned on a trigger, then the process 220 proceeds to stage 236 discussed below. If the user does want the event expression evaluation conditioned on a trigger, then the process 220 proceeds to stage 232.

At stage 232, the trigger evaluation is enabled by the user selecting the button 106 on the screen 80. This selection enables the windows 108, 110, 112, and 114 for configuring the trigger. If a trigger is enabled, then the device manager 22 inhibits indicating whether the user-configured event occurs in the absence of the occurrence of the event trigger. This may be accomplished in a variety of ways, e.g., by inhibiting evaluation of the event, inhibiting reporting of an evaluated event, etc.

At stage 234, the trigger is configured using the windows 108, 110, 112, and 114. The user selects the source (windows 108, 110), the normal/abnormal state (window 112), and the trigger delay (window 114). The process 220 proceeds to stage 238 described below.

At stage 236, the user disables the trigger by selecting the button 104 indicating a continuous evaluation of the event expression. The trigger configuration windows 108, 110, 112, and 114 either remain or are changed to inhibit their use and preferably remain or are changed to shadowing (indicating their unavailability).

At stage 238, alarm mapping as desired is selected. The user selects any of the desired features in the alarm mapping section 92, here for designating the major/minor character of the event, whether to actuate outlets, a beacon, or relays, in response to the event being realized, although other types of controllable outputs may be used and actuated.

At stage 240, persistence parameters are entered by the user. The user can be presented with the screen 140 (FIG. 9) for entering persistence parameters, as described with respect to FIG. 12 below, by selecting a recipient, e.g., an e-mail recipient, shown on the screen 120.

At stage 242, the event is enabled. With the event configured, the user selects "enabled" in the enabled/disabled window 82 to initiate evaluation of the event criteria.

At stage 244, the user sets the event configuration parameters. With the event configured as desired, the user actuates the apply button 116 to set the entries shown on the screen 80.

At stage 246, a decision is made as to whether additional events are to be configured. The user selects corresponding configure event link 144 from the screen 130 if further event configuring is desired and the process 220 returns to stage 222, and otherwise the process 220 ends at stage 248.

Figure 12:
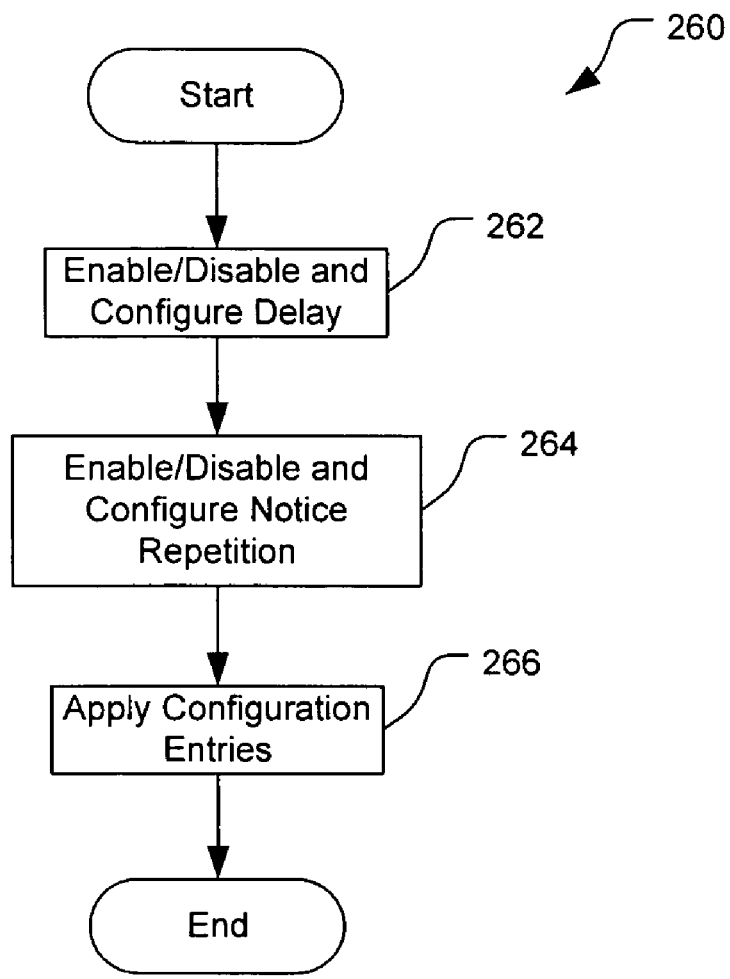
FIG. 12 is a block flow diagram of a process of configuring event notification parameters using a configuration terminal shown in FIG. 1.

In operation, referring to FIG. 12, with further reference to FIGS. 1-3 and 9, a process 260 for customizing notification parameters of events using the configuration terminal 16 includes the stages shown. The process 260, however, is exemplary only and not limiting. The process 260 may be altered, e.g., by having stages added, removed, or rearranged. Further, the process 260 may be applied to various applications (e.g., to actions other than event notification).

At stage 262, the notification delay is enabled or disabled and appropriate delay parameters selected as appropriate. The user enables or disables the notification delay to the selected recipient using the delay selector window 142. If the delay is enabled, then the user enters desired quantity and units for the notification delay using the selection windows 144, 146, with the window 146 providing a drop-down menu.

At stage 264, the user enables/disables notice repetition and enters persistence parameters for the notification as appropriate. The user enables or disables repeated notification using the window 148. If enabled, the user enters/selects the quantity and units of time intervals between repeated notices using the windows 150, 152. The user also enters/selects desired limits on the repeated notices. The user uses the windows 154, 158 to set a quantity limit on the repeated notices and uses the window 156 to limit the notices to the duration of the event.

At stage 266, the user applies the desired notification parameters. With the notification parameters configured as desired, the user actuates the apply button 159 to set the entries shown on the screen 140.

Other embodiments are within the scope and spirit of the appended claims. For example, due to the nature of software, functions described above can be implemented using software, hardware, firmware, hardwiring, or combinations of any of these. Features implementing functions may also be physically located at various positions, including being distributed such that portions of functions are implemented at different physical locations. For example, the functions performed by the device manager 22 of customizing events per user input, collecting information, analyzing events, and providing notices and alarms could be performed elsewhere. For instance, these functions could be performed at the remote configuration terminal. Further, a delay for determining that an event has occurred may be provided similar to the delays shown for activating signals and notifying recipients of events.

What is claimed is:

1. A monitoring system for use with at least one device configured to provide information relating to the device, the system comprising:
   at least one first input configured to receive a plurality of second inputs from the at least one device indicative of at least one parameter relating to the at least one device; and
   a processor coupled to the at least one first input, the processor configured to provide a user with indicia of the second inputs for defining an event and at least one criterion for defining the event using at least one of the second inputs, the processor being configured to prompt the user to define the event using at least one of the second inputs and the at least one criterion and to provide guidance to the user regarding the second inputs and the at least one criterion for defining the event, wherein the processor is configured to provide a user interface for the user, the user interface providing the indicia of second inputs for defining monitored events and the at least one criterion for defining the events using at least one of the second inputs.

2. The system of claim 1 wherein the guidance includes indicia of at least one of second input types, characteristics of the second inputs to evaluate, and ways to combine event components related to the second inputs into the event.

3. The system of claim 2 wherein the guidance includes the indicia of the characteristics and the characteristics include whether the data input is normal or abnormal.

4. The system of claim 2 wherein the guidance includes the indicia of the characteristics and the characteristics include amounts of time for a second input to remain at a designated state before changing a condition of a corresponding event component.

5. The system of claim 4 wherein the characteristics include different amounts of time for setting the corresponding event component to a first condition and for returning the corresponding event component to a second condition.

6. The system of claim 2 wherein the guidance includes the indicia of the second input types that include a first menu of input types and a second menu of type instances, and wherein which instances are provided in the second menu depend upon a presently-selected input type in the first menu.

7. The system of claim 2 wherein the processor is configured to prompt the user to select from Boolean logic combinations of the event components to define the event.

8. The system of claim 2 wherein the processor is configured to prompt the user to enter a sum of product combination of event components to define the event.

9. The system of claim 2 wherein the event components are second inputs that meet selected criteria.

10. The system of claim 1 wherein the processor is configured to prompt the user to select from actions to take in response to the defined event occurring.

11. The system of claim 10 wherein the actions include at least one of providing an event-active text message, providing an event-inactive text message, actuating an alarm, actuating a system outlet, actuating a system relay, sending an email, sending an SNMP trap, sending a syslog notice, sending an occurrence log notice, sending a page for a pager.

12. The system of claim 10 wherein the processor is configured to prompt the user to configure at least one of an amount of delay from the defined event occurring before taking an action and whether to repeat a selected action.

13. The system of claim 10 wherein the processor is configured to prompt the user to configure, for an action selected to be repeated, at least one of an interval between repetitions of the selected action, and a limit for the repetitions, the limit being at least one of a number of repetition times and an indication to stop the repetitions if the defined event ceases to be satisfied.

14. A monitoring system for use with at least one device configured to provide information relating to the device, the system comprising:
   at least one first input configured to receive a plurality of second inputs from the at least one device indicative of at least one parameter relating to the at least one device; and
   a processor coupled to the at least one first input, the processor configured to provide a user with indicia of the second inputs for defining an event and at least one criterion for defining the event using at least one of the second inputs, the processor being configured to prompt the user to define the event using at least one of the second inputs and the least one criterion and to provide guidance to the user regarding the second inputs and the at least one criterion for defining the event, wherein the processor is configured to prompt the user to configure an event trigger, and the processor is configured to evaluate, in response to occurrence of the event trigger, whether the user-configured event occurs.

15. A method of defining an event associated with at least one device configured to provide information relating to the at least one device, the method comprising:
   providing a user with first indicia of monitored parameters relating to the at least one device;
   providing the user with at least one second indication of at least one criterion for defining the event using at least one of the monitored parameters;

prompting the user to define the event using at least one of the monitored parameters and the at least one criterion, including suggesting to the user how to define the event using at least one of the monitored parameters and the at least one criterion;

prompting the user to configure an event trigger; and evaluating, in response to occurrence of the event trigger, whether the user-configured event occurs.

16. The method of claim 15 wherein the suggesting includes at least one of indicating types of the monitored parameters, characteristics of the monitored parameters to evaluate, and ways to combine event portions related to the monitored parameters into the event.

17. A method of defining an event associated with at least one device configured to provide information relating to the at least one device, the method comprising:

providing a user with first indicia of monitored parameters relating to the at least one device;

providing the user with at least one second indication of at least one criterion for defining the event using at least one of the monitored parameters; and prompting the user to define the event using at least one of the monitored parameters and the at least one criterion, including suggesting to the user how to define the event using at least one of the monitored parameters and the at least one criterion, the suggesting including at least one of indicating types of the monitored parameters, characteristics of the monitored parameters to evaluate, and ways to combine event portions related to the monitored parameters into the event, wherein the characteristics are amounts of time for a monitored parameter to remain at a designated state before changing a condition of a corresponding event portion.

18. A method of defining an event associated with at least one device configured to provide information relating to the at least one device, the method comprising:

providing a user with first indicia of monitored parameters relating to the at least one device;

providing the user with at least one second indication of at least one criterion for defining the event using at least one of the monitored parameters; and prompting the user to define the event using at least one of the monitored parameters and the at least one criterion, including suggesting to the user how to define the event using at least one of the monitored parameters and the at least one criterion, the suggesting including at least one of indicating types of the monitored parameters, characteristics of the monitored parameters to evaluate, and ways to combine event portions related to the monitored parameters into the event, wherein indicating types of the monitored parameters includes providing a first menu of parameter types and a second menu of type instances, and wherein which instances are provided in the second menu depend upon a presently-selected input type in the first menu.

19. The method of claim 16 wherein indicating ways to combine event components includes prompting the user to select from Boolean logic combinations of event portions to define the event.

20. The method of claim 15 further comprising prompting the user to select from actions to take in response to a defined event occurring, the actions including at least one of providing an event-active text message, providing an event-inactive text message, actuating an alarm, actuating a system outlet, and actuating a system relay.

21. A method of defining an event associated with at least one device configured to provide information relating to the at least one device, the method comprising:

providing a user with first indicia of monitored parameters relating to the at least one device;

providing the user with at least one second indication of at least one criterion for defining the event using at least one of the monitored parameters;

prompting the user to define the event using at least one of the monitored parameters and the at least one criterion, including suggesting to the user how to define the event using at least one of the monitored parameters and the at least one criterion; and further comprising at least one of:

prompting the user to select from actions to take in response to a defined event occurring;

prompting the user to configure an amount of delay from the defined event occurring before taking an action; and prompting the user to configure whether to repeat a selected action.

22. A method of defining an event associated with at least one device configured to provide information relating to the at least one device, the method comprising:

providing a user with first indicia of monitored parameters relating to the at least one device;

providing the user with at least one second indication of at least one criterion for defining the event using at least one of the monitored parameters;

prompting the user to define the event using at least one of the monitored parameters and the at least one criterion, including suggesting to the user how to define the event using at least one of the monitored parameters and the at least one criterion; and prompting the user to select from actions to take in response to a defined event occurring including prompting the user to configure, for an action selected to be repeated, at least one of an interval between repetitions of the selected action, and a limit for the repetitions, the limit being at least one of a number of repetition times and an indication to stop the repetitions if the defined event ceases to be satisfied.

23. The method of claim 15 wherein the first indicia and the second indication and are provided, and the user is prompted to define the event, through a graphical user interface.

24. A computer program product for use with a computer for receiving status information regarding at least one device, the computer program product residing on a computer-readable medium and comprising computer readable instructions for causing the computer to:

present a user in communication with the computer with indications of the status information and options for defining a user-configured event related to the status information;

accept input from the user regarding the options to define the user-configured event; and analyze the status information in accordance with the selected options to evaluate whether the user-configured event occurs;

wherein the status information comprises input data regarding monitored parameters associated with the at least one device and the options comprise selectable indications of the input data.

25. The computer program product of claim 24 wherein the options for defining the user-configured event include indicia of at least one of types of the at least one device, characteristics of the status information to evaluate, and ways to combine event components related to the status information into the event.

26. The computer program product of claim 24 further comprising instructions for causing the computer to prompt the user to configure an amount of time that input data must have a certain value before a status of the input data will be considered changed from a previous status.

27. The computer program product of claim 26 wherein the instructions for causing the computer to prompt the user to configure an amount of time include instructions for causing the computer to prompt the user to configure first and second amounts of time that input data must have first and second values before a status of the input data will be considered changed from first and second previous status, respectively.

28. A computer program product for use with a computer for receiving status information regarding at least one device, the computer program product residing on a computer-readable medium and comprising computer readable instructions for causing the computer to:
 present a user in communication with the computer with indications of the status information and options for defining a user-configured event related to the status information;
 accept input from the user regarding the options to define the user-configured event; and
 analyze the status information in accordance with the selected options to evaluate whether the user-configured event occurs;
 wherein the options include options for configuring indicia of the status information regarding monitored parameters associated with the at least one device and the options comprise selectable indications of the user-configured indicia.

29. The computer program product of claim 24 wherein the options comprise Boolean logic connectors.

30. A computer program product for use with a computer for receiving status information regarding at least one device, the computer program product residing on a computer-readable medium and comprising computer readable instructions for causing the computer to:
 present a user in communication with the computer with indications of the status information and options for defining a user-configured event related to the status information;
 accept input from the user regarding the options to define the user-configured event;
 analyze the status information in accordance with the selected options to evaluate whether the user-configured event occurs; and
 prompt the user to configure an event trigger, and instructions for causing the computer to evaluate, in response to occurrence of the event trigger, whether the user-configured event occurs.

31. The computer program product of claim 24 further comprising instructions for causing the computer to prompt the user to configure event indications to be provided by the computer and instructions for causing the computer to provide an indication of occurrence of the user-configured event.

32. The computer program product of claim 31 further comprising instructions for causing the computer to prompt the user to select whether to repeat the event indications and to configure, for an indication selected to be repeated, at least one of an interval between repetitions of the selected action, and a limit for the repetitions, the limit being at least one of a number of repetition times and an indication to stop the repetitions if the defined event ceases to be satisfied.

33. A monitoring system for use with at least one device configured to provide information relating to the device, the system comprising:
 at least one input configured to receive information from the at least one device indicative of at least one parameter relating to the at least one device; and
 a processor coupled to the at least one input, the processor configured to receive instructions from a user for defining a monitored event using the received information and to evaluate the event according to the definition of the event to determine whether the event definition is satisfied, the processor being configured to receive instructions from the user for taking an action in response to the event definition being satisfied and for taking the action only if the event definition is satisfied for at least an instructed amount of time.

34. The system of claim 33 wherein the processor is configured to prompt the user to provide at least some of the instructions.

35. The system of claim 34 wherein the processor is configured to prompt the user to provide instructions setting the amount of time.

36. The system of claim 34 wherein the processor is configured to provide web pages to prompt the user to provide the at least some of the instructions.

37. A monitoring system for use with at least one device configured to provide information relating to the device, the system comprising:
 at least one input configured to receive information from the at least one device indicative of at least one parameter relating to the at least one device; and
 a processor coupled to the at least one input, the processor configured to receive instructions from a user for defining a monitored event using the received information and to evaluate the event according to the definition of the event to determine whether the event definition is satisfied, the processor being configured to receive instructions from the user for taking an action in response to the event definition being satisfied;
 wherein the processor is configured to condition evaluation on a triggering activity and to evaluate the event definition only in response to the triggering activity occurring if the event evaluation is conditioned on the triggering activity.

38. The system of claim 37 wherein the processor is configured to receive instructions from the user to condition the event evaluation on the triggering activity.

39. The system of claim 38 wherein the triggering activity includes a change in status of least one of the at least one device.

40. The system of claim 39 wherein the triggering activity requires the change in status to have remained for at least a designated amount of time provided by the user.

* * * * *